US012566983B2

(12) United States Patent (10) Patent No.: US 12,566,983 B2
Liao et al. (45) Date of Patent: Mar. 3, 2026

(54) MACHINE LEARNING CLASSIFIERS PREDICTION CONFIDENCE AND EXPLANATION

(71) Applicant: INTERNATIONAL BUSINESS MACHINES CORPORATION, Armonk, NY (US)

(72) Inventors: Qingzi Liao, White Plains, NY (US); Yunfeng Zhang, Chappaqua, NY (US); Rachel Katherine Emma Bellamy, Bedford, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1035 days.

(21) Appl. No.: 17/121,871

(22) Filed: Dec. 15, 2020

(65) Prior Publication Data

US 2022/0188674 A1 Jun. 16, 2022

(51) Int. Cl.
*G06N 20/20* (2019.01)
*G06F 18/214* (2023.01)
(Continued)

(52) U.S. Cl.
CPC ......... *G06N 5/045* (2013.01); *G06F 18/2148* (2023.01); *G06F 18/2415* (2023.01); *G06N 20/20* (2019.01)

(58) Field of Classification Search
CPC ........ G06N 5/045; G06N 20/20; G06N 3/042; G06N 5/01; G06N 3/00; G06N 5/00;
(Continued)

(56) References Cited

U.S. PATENT DOCUMENTS 8,676,731 B1 3/2014 Sathyanarayana
8,868,472 B1 * 10/2014 Lin .......................... G06N 5/02
706/12

(Continued)

FOREIGN PATENT DOCUMENTS

WO WO-2020185101 A1 * 9/2020
WO WO-2020185101 A9 * 1/2021

OTHER PUBLICATIONS

Shah et al. "Evaluating Explanations of Convolutional Neural Network Image Classifications" (Year: 2020).*

(Continued)

*Primary Examiner* — Kakali Chaki
*Assistant Examiner* — Johnathan R Germick
(74) *Attorney, Agent, or Firm* — Amin, Turocy & Watson, LLP

(57) ABSTRACT

A method, a computer system, and a computer program product for generating explanations for different confidence levels of machine learning classifiers is provided. Embodiments of the present invention may include obtaining a dataset. Embodiments of the present invention may include training a first classifier using the dataset to generate probabilities. Embodiments of the present invention may include generating confidence scores using the first classifier. Embodiments of the present invention may include defining targeted confidence zones by transforming the generated probabilities into the confidence scores. Embodiments of the present invention may include training a second classifier to derive explanations. Embodiments of the present invention may include providing the explanations as an output.

20 Claims, 5 Drawing Sheets

200

Obtain Dataset 202

Train First Classifier to Generate Probabilities 204

Generate Confidence Scores 206

Define Targeted Confidence Zone 208

Train Second Classifier to Derive Explanations 210

Present Explanation to User 212

(51) Int. Cl.
　　*G06F 18/2415* 　　(2023.01)
　　*G06N 5/045* 　　(2023.01)
(58) Field of Classification Search
　　CPC .......... G06N 7/00; G06N 20/00; G06N 99/00;
　　　　　　　G06F 18/2148; G06F 18/2415; G06K
　　　　　　　9/6257; G06K 9/6277; G06V 10/774;
　　　　　　　　　　　　　　　　　　G06V 10/776
　　See application file for complete search history.

(56) References Cited

U.S. PATENT DOCUMENTS

| | | | | |
|---|---|---|---|---|
| RE45,770 | E | 10/2015 | Flinn | |
| 9,600,779 | B2 * | 3/2017 | Hoover | G06F 3/0481 |
| 9,679,261 | B1 * | 6/2017 | Hoover | G06N 20/00 |
| 9,691,027 | B1 | 6/2017 | Sawant | |
| 10,824,959 | B1 * | 11/2020 | Chatterjee | G06N 20/00 |
| 11,694,093 | B2 * | 7/2023 | Perez | G06N 5/022 |
| | | | | 706/12 |
| 2014/0229164 | A1 * | 8/2014 | Martens | G06F 40/279 |
| | | | | 704/9 |
| 2016/0155069 | A1 * | 6/2016 | Hoover | G06Q 30/06 |
| | | | | 706/12 |
| 2016/0259842 | A1 * | 9/2016 | Knight | G06F 16/285 |
| 2018/0285771 | A1 * | 10/2018 | Lee | G06N 20/00 |
| 2019/0130226 | A1 * | 5/2019 | Guo | G06F 18/10 |
| 2019/0197431 | A1 * | 6/2019 | Gopalakrishnan | G06N 20/00 |
| 2019/0354805 | A1 * | 11/2019 | Hind | G06F 18/253 |
| 2020/0020000 | A1 * | 1/2020 | Guy | G06Q 30/0282 |
| 2020/0111572 | A1 * | 4/2020 | Bergen | G16H 15/00 |
| 2021/0089957 | A1 * | 3/2021 | Ermans | G06N 3/045 |
| 2023/0316204 | A1 * | 10/2023 | Liu | G06Q 10/06375 |
| | | | | 705/7.37 |

OTHER PUBLICATIONS

Soko el at. "LIMEtree Consistent and Faithful Multi-class Explanations" (Year: 2020).*
Sarwar, B., Karypis, G., Konstan, J., & Riedl, J. (2001). Item-based Collaborative Filtering Recommendation Algorithms. Proceedings of ACM World Wide Web Conference, 1. (Year: 2001).*
Kolter, J., & Maloof, M. (2004). Learning to detect malicious executables in the wild. In Proceedings of the Tenth ACM SIGKDD International Conference on Knowledge Discovery and Data Mining (pp. 470-478). Association for Computing Machinery. (Year: 2004).*
Terrance DeVries, & Graham W. Taylor. (2018). Learning Confidence for Out-of-Distribution Detection in Neural Networks. (Year: 2018).*

W. Zhang, H. Wang, K. Ren and J. Song, "Chinese sentence based lexical similarity measure for artificial intelligence chatbot," 2016 8th International Conference on Electronics, Computers and Artificial Intelligence (ECAI), Ploiesti, Romania, 2016, pp. 1-4, doi: 10.1109/ECAI.2016.7861160. (Year: 2016).*
Mehmet Yigit Yildirim, Mert Ozer, & Hasan Davulcu. (2019). Leveraging Uncertainty in Deep Learning for Selective Classification. (Year: 2019).*
Kirill Bykov, Marina M.-C. Höhne, Klaus-Robert Müller, Shinichi Nakajima, & Marius Kloft. (2020). How Much Can I Trust You?—Quantifying Uncertainties in Explaining Neural Networks. (Year: 2020).*
Augasta et al., "Reverse Engineering the Neural Networks for Rule Extraction in Classification Problems", Article, Neural Processing Letters, Apr. 2012, https://doi.org/10.1007/s11063-011-9207-8, 4 pages.
Carvalho et al., "Machine Learning Interpretability: A Survey on Methods and Metrics", Electronics 2019, 8, 832, www.mdpi.com/journal/electronics, pp. 1-34.
Cohen, "Fast Effective Rule Induction", ScienceDirect, Machine Learning Proceedings 1995, Proceedings of the Twelfth International Conference on Machine Learning, Tahoe City, California, Jul. 9-12, 1995, 2 pages.
Deutch et al., "Explaining White-box Classifications to Data Scientists (technical report)", 2018, pp. 1-28.
Jiang et al., "To Trust or Not to Trust a Classifier", 32nd Conference on Neural Information Processing Systems (NIPS 2018), Montreal, Canada, 25 pages.
Kailkhura et al., "Reliable and explainable machine-learning methods for accelerated material discovery", npj Computational Materials (2019) 5:108 ; https://doi.org/10.1038/s41524-019-0248-2, pp. 1-9.
Petkovic et al., Improving the explainability of Random Forest classifier-user centered approachAuthor Manuscript, , HHS Public Access, Pac Symp Biocomput. Author manuscript; available in PMC Jan. 1, 2018, pp. 1-16.
Phillips et al., "Interpretable Active Learning", Journal of Machine Learning Research 81:1-13, 2018, Conference on Fairness, Accountability, and Transparency, 13 pages.
Ribeiro et al., "Anchors: High-Precision Model-Agnostic Explanations", Copyright 2018, Association for the Advancement of Artificial Intelligence, 9 pages.
Ribeiro et al., "Why Should I Trust You?" Explaining the Predictions of Any Classifier, KDD 2016, San Francisco, CA, USA, 10 pages.
Teso, "Why Should I Trust Interactive Learners?" Explaining Interactive Queries of Classifiers to Users, May 22, 2018, DeepAI, 28 pages.
Mell et al., "The NIST Definition of Cloud Computing", Recommendations of the National Institute of Standards and Technology, Special Publication 800-145, Sep. 2011, 7 pages.

* cited by examiner

100

200

Obtain Dataset 202

Train First Classifier to
Generate Probabilities 204

Generate Confidence Scores 206

Define Targeted
Confidence Zone 208

Train Second Classifier to
Derive Explanations 210

Present Explanation to User 212

900

902a, b
Internal Components 904a, b
External Components

906 — PROCESSOR(S)

912

908 — RAM(S)

910 — ROM(S)

COMPUTER READABLE
STORAGE MEDIA 915
- OPERATING SYSTEM(S) 914
 - APPLICATION PROGRAMS 915

916

930

DEVICE
DRIVERS

918

R/W
DRIVE OR
INTERFACE

922

NETWORK
ADAPTER OR
INTERFACE

924

926

928

PORTABLE
COMPUTER
READABLE
STORAGE
MEDIA

920

TO NETWORK

1000C

1000N

1000

1050

1000A

1000B

MACHINE LEARNING CLASSIFIERS PREDICTION CONFIDENCE AND EXPLANATION

BACKGROUND

The present invention relates generally to the field of computing, and more particularly to machine learning. Machine learning and model predictions are widely used and relied on in many different industries. Model outputs may provide users with confidence scores for specific predictions and descriptions of how a model works. Confidence scores can be subject to calibration issues and are not always accurate.

SUMMARY

Embodiments of the present invention disclose a method, a computer system, and a computer program product for generating explanations for different confidence levels of machine learning classifiers. Embodiments of the present invention may include obtaining a dataset. Embodiments of the present invention may include training a first classifier using the dataset to generate probabilities. Embodiments of the present invention may include generating confidence scores using the first classifier. Embodiments of the present invention may include defining targeted confidence zones by transforming the generated probabilities into the confidence scores. Embodiments of the present invention may include training a second classifier to derive explanations. Embodiments of the present invention may include providing the explanations as an output.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
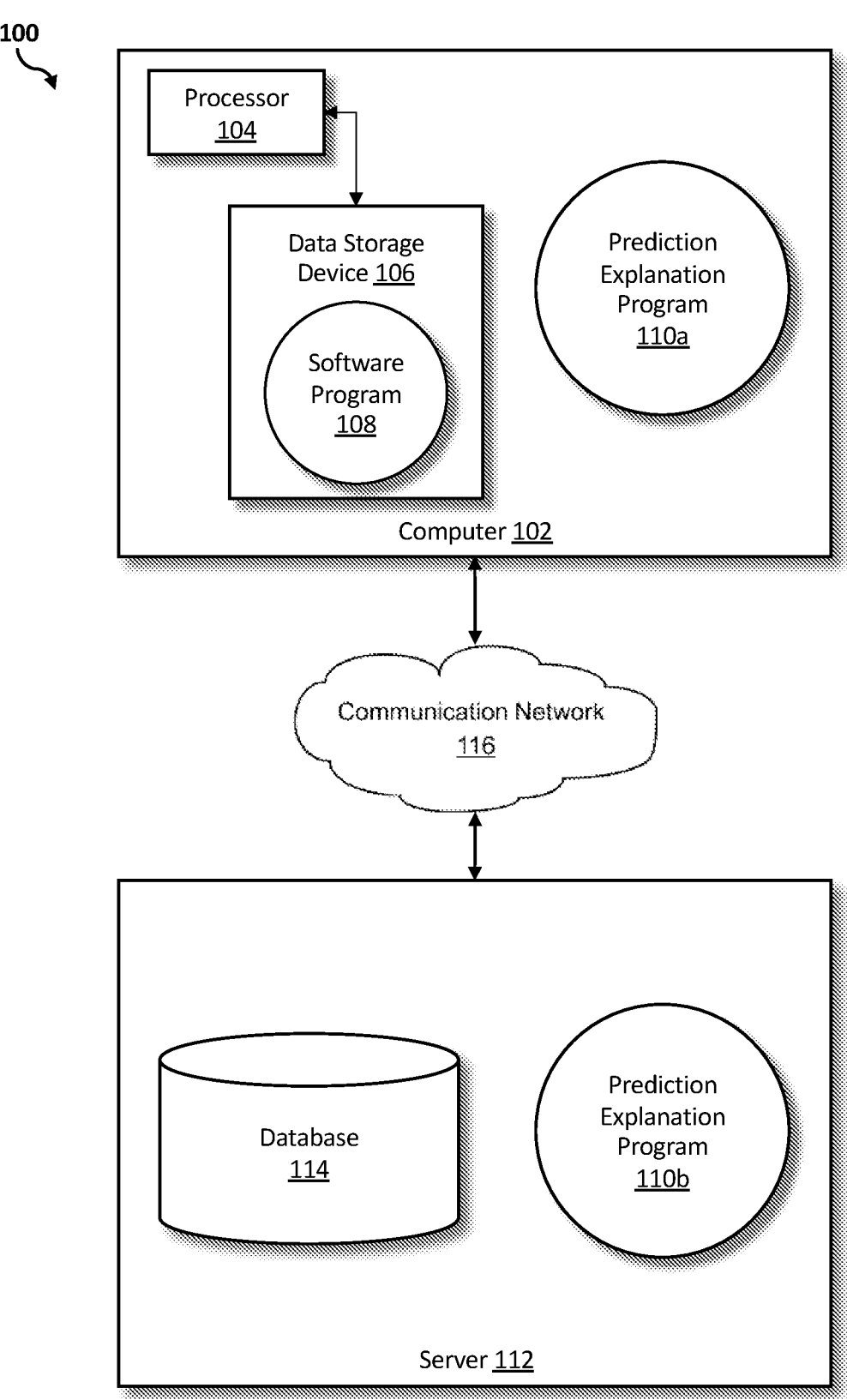
FIG. 1 illustrates a networked computer environment according to at least one embodiment.

Detailed embodiments of the claimed structures and methods are disclosed herein, however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

As previously described, machine learning and model predictions are widely used and relied on in many different industries. Model outputs may provide users with confidence scores for specific predictions and descriptions of how a model works. Confidence scores can be subject to calibration issues and are not always accurate. Although existing machine learning techniques present confidence scores for specific predictions, the current confidence scores do not assist users with understanding why or when to trust a model. Allowing a user to have better information and explanations about model predictions and about model functionality will provide better user understanding, interaction and debugging capabilities.

As explainable artificial intelligence (XAI) gains momentum relating to machine learning applications, such as a decision-support system, more importance is being placed on knowing when a user can trust a model. For example, much effort has been placed on understanding a whole model, such as confidence scores, however, a user is not provided with information to know when to trust a model and when to be more cautious when using a model. Many explainable artificial intelligence (XAI) methods have focused on two areas. One area is describing how a model works. The other area is justifying a particular decision of the model. Neither areas directly address when to trust a model and when not to trust a model. Therefore, it may be advantageous to, among other things, provide explanations that allow users to judge the reliability of the confidence level of a model.

The following described exemplary embodiments provide a system, a method and a program product for machine learning. As such, embodiments of the present invention have the capacity to improve the technical field of machine learning by generating explanations for prediction confidence levels of machine learning classifiers. More specifically, explanations of a machine learning model's confidence levels will be provided to users to allow each user to know when a model can be trusted with high confidence or when a model is to be distrusted with low confidence. The explanations allow users to judge the reliability of the confidence level of a model by applying the domain knowledge of the user or by allowing the user to consider the user expertise based on the explanation provided.

Multiple advantages are created by the use of a predication explanation program. One advantage includes assisting a user with knowing when to trust or rely on a machine learning (ML) model and when not to rely on a machine learning (ML) model by providing the user with transparent descriptions of cases with varied levels of confidence. Another advantage includes allowing a user to adapt to the usage, the interaction and the development of the machine learning (ML) model since the user will be provided with information relating to understanding the reasoning for the varied levels of confidence (e.g., what created the low or high confidence score). Another advantage includes fast generation of explanations even on complex models, such as a deep neural network, and the model will not be required to be retrained. Another advantage includes providing simple presentations of explanations to a user, such as by providing explicit rules, decisions trees or feature sets that are easy to understand for an end user.

According to an embodiment, various types of machine learning (ML) models and classifiers may be trained, built and used to create predictive results. Models may be trained and built to offer predictions and classifiers may be trained and built to offer predictions for machine learning algorithms, for example, in the form of assigning categories or class labels to data points. Classifiers may be used to predict classes, categories or labels of data points. Classifiers may also be used to determine probabilities, such as a Bayes classifier. Multiple different classifiers or classification algorithms may be used, such as binary classifiers or predictive model classifiers. Binary classifiers may produce, for example, decision trees as an output. Predictive model classifiers may predict a class label based on input data. The type of classifier that is used may depend on the available dataset. The type of classifier used may also depend on the type of output that is desirable for a user.

Data or information from different industries that provide services and microservices that rely on machine learning predictions may be obtained from many different sources, ontologies and domains or domain knowledge. Different sources and domains may be related to, for example, corporate services, software services, legal services, medical services, automotive services, utility services, emergency services, weather services, news services, non-profit rescue services, social media, regional services, government services, equipment services, food supply services and academic services.

Data collected and received for the various domains may be used as datasets for training, building, running and fine-tuning machine learning models and classifiers. The collected data may be used for analysis and added to a corpus or a database that stores the training data, the predictive results, the confidence values or scores, the explanations, the feedback data and the model performance data. Data may be collected from multiple sources and source databases based on the domain. The sources may include public databases and private databases if the company, user or client has proper accessibility to the private domain database. The collected data may, for example, be received from various devices through a communication network, such as computing devices, servers, internet of things (IoT) devices, global positioning system (GPS) devices, sensors, smart watches, smart phones, smart tablets, personal computers or automotive devices.

Machine learning (ML) models may also include deep learning models, artificial intelligence (AI) models, neural networks, artificial neural networks (ANNs) and regression models. Deep learning may also be related to or known as hierarchical learning or deep structured learning. The term model may be used to indicate various types of machine learning models and classifiers, such as a deep learning model, a neural network model, a trained model, an attention-based model, a classification model, a regression model or a decision tree model. Explanations may be derived for all types of machine learning (ML) models and classifiers.

Cognitive analyses, such as natural language processing (NLP) and semantic analysis, may be used during the building and training of a model. The cognitive analytics may analyze both structured and unstructured data to be incorporated into the machine learning (ML) process. Natural language processing (NLP) may be used to analyze the quality of data or feedback that is received for training and model building. Structured data may include data that is highly organized, such as a spreadsheet, a relational database or data that is stored in a fixed field. Unstructured data may include data that is not organized and has an unconventional internal structure, such as a portable document format (PDF), text data or a text document, an image, a presentation, a webpage, video content, audio content, an email, a word processing document or multimedia content.

The received data may be processed using natural language processing (NLP) to extract meaningful information for training and building a model. Semantic analysis may be used to infer the complexity, meaning and intent of the information or data received to assist in the asynchronous model building. Semantic analysis may also consider syntactic structures of information at various levels to infer meaning to words, phrases, sentences and paragraphs of the received, collected or extracted data. The received data may be converted appropriately for a classifier and to train classifiers accordingly. For example, structured data, such as a spreadsheet, may be used to train some classifiers while other classifiers may be trained using unstructured data, such as a text document.

According to an embodiment, machine learning classifiers may be used to generate explanations or descriptions of the classifier's predictions with varying levels of confidence. Explanations are generated, using classifiers, to explain a model's confidence and why a model is confident or not confident about the model's predictions. An explanation is provided based on a model's confidence value, for example, to assist a user in understanding when a model's prediction is trustworthy. Levels of confidence for a model may be produced, for example, a low confidence, a medium confidence or a high confidence. The levels of confidence have confidence values associated with the levels.

Three use case examples are provided herein. In the provided examples, a user or client is operating a computing device, a prediction explanation program is located on one or more servers or on a user computing device connected in a cloud environment. The servers and the computing devices transmit in the cloud environment via a communication network. The first use case provides a scenario when a user operates or uses a machine learning (ML) model in the workplace. The second use case provides a scenario when a user is interacting with a machine learning (ML) model. The third use case provides a scenario of debugging a machine learning (ML) model.

The first example includes a user in the banking industry utilizing a machine learning (ML) model. The bank may be a client that utilizes a prediction explanation program to assist employees with making beneficial decisions for clients while balancing the risk associated with the decisions. The user of the prediction explanation program may be an employee of a bank that provides loans to clients. The employee may want to know if a loan applicant has a high risk of repaying the loan based on the customer's profile and based on the information willingly provided by the customer to the employee for the purposes of securing a loan with the bank. The employee is hesitant to use a model to predict risk as the employee has previously experienced that the model provides an output that contains mistakes approximately 20% of the time.

The employee has been able to obtain a confidence score for the model prediction, however, the employee would not understand why some cases or loan applicants would have more confidence than others or a higher score than others. Additionally, the employee may be uneasy making a decision for the client based on, for example, a 90% confidence score as the employee won't know if that is a good enough score for the risk of the loan. The employee may manually check every case but the manual checking slows down the business process and the loan process.

When the employee uses the prediction explanation program, the employee receives an explanation or a description for the confidence level of the prediction and not just a score. The explanation allows the employee to understand how the model is interpreting the information. An example explanation presented to the user relating to the prediction can be "if the client has an annual income of X and the client is under the age of Y, the model provides a confident prediction. Based on experience, the employee can interpret the risk better and can make decisions based on the prediction and the explanation without the manual checking of every case.

The second example includes a chatbot that uses machine learning (ML) classifiers for the chatbot's natural language understanding capability. The classifiers rank the confidence scores for all classes or intent to determine the top intent. In the context of a chatbot, intent is a label for a group of sentences that have the same meaning or communicate the same intention. In this example, a recent study shows that disclosing how the machine learning (ML) classifiers work could help users produce utterances that the system can process better. For instance, the users will provide training utterances for a chatbot to recognize different intents in the words, language or utterances.

When a user is provided with information of how a classifier works, analyzes information or operates, then the user can provide higher quality training data for training the classifier. Some simple confidence rules can fit in the content of a dialog and directly address what type of input may fall in the low-confidence zone. The dialog could generate rules such as "I had trouble understanding words such as Hong Kong, Tokyo, Beijing." This dialog allows the user to understand that the chatbot is not equipped with location specific information. The keywords or the feature set could be generated based on a common set of low-confidence keywords features over all intent classifiers. Low-confidence keywords in the context of this example are the location words of the cities. The chatbot is conveying the message to the user, based on the response provided, that when location words are provided by a user that the chatbot operating with the classifier has difficulty in recognizing the sentence's intent.

As an option, the low-confidence keyword set could be filtered further based on the closeness to the user's previous input (e.g., "Tokyo). The chatbot may provide the user with the set of words that the chatbot is not confident about and the filtering may assist with defining the low-confidence keywords set.

The third example includes a team of data scientists and medical experts who are building an image classifier to detect Pneumonia. The model generates explanations for low-confidence zones based on super-pixels and presents the explanations to the medical experts. A low-confidence zone may be certain patterns of x-ray images. For example, the classifier may be very confident in classifying a round shape of shadow as pneumonia, but the classifier may not be confident in classifying what a square shape of the shadow represents. Thus, the classifier may lack the knowledge or response to provide medically correct examples. The explanation can state "the system has a low confidence of classifying images with this kind of pattern." The medical experts will quickly understand, based on this explanation, that there is a lack of positive training data with this particular kind of image, which is known to be an indicator of Pneumonia. The team of data scientists and medical experts can add more training data with the particular kind of image to further train the model.

Referring to FIG. 1, an exemplary networked computer environment 100 in accordance with one embodiment is depicted. The networked computer environment 100 may include a computer 102 with a processor 104 and a data storage device 106 that are enabled to run a software program 108 and a prediction explanation program 110a. The networked computer environment 100 may also include a server 112 that is enabled to run a prediction explanation program 110b that may interact with a database 114 and a communication network 116. The computer 102 may also be known as a client computer and the server 112 may also be known as a server computer. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The computer 102 may communicate with the server 112 via the communications network 116. The communications network 116 may include connections, such as wire, wireless communication links, or fiber optic cables. As will be discussed with reference to FIG. 3, server 112 may include internal components 902a and external components 904a, respectively, and computer 102 may include internal components 902b and external components 904b, respectively. The server 112 may also operate in a cloud computing service model, such as Software as a Service (SaaS), Analytics as a Service (AaaS), Blockchain as a Service (BaaS), Platform as a Service (PaaS), or Infrastructure as a Service (IaaS). Server 112 may also be located in a cloud computing deployment model, such as a private cloud, community cloud, public cloud, or hybrid cloud. Computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the prediction explanation program 110a, 110b may interact with a database 114 that may be embedded in various storage devices, such as, but not limited to a computer/mobile device 102, a server 112, or a cloud storage service.

According to the present embodiment, a user operating a computer 102 or a server 112 (e.g., a server computer) may use the prediction explanation program 110a, 110b (respectively) to generate explanations for a prediction confidence of machine learning (ML) classifiers. The prediction explanation method is explained in more detail below with respect to FIG. 2.

Figure 2:
FIG. 2 is an operational flowchart illustrating a process for generating explanations for different confidence levels of machine learning classifiers according to at least one embodiment.
Figure 2:
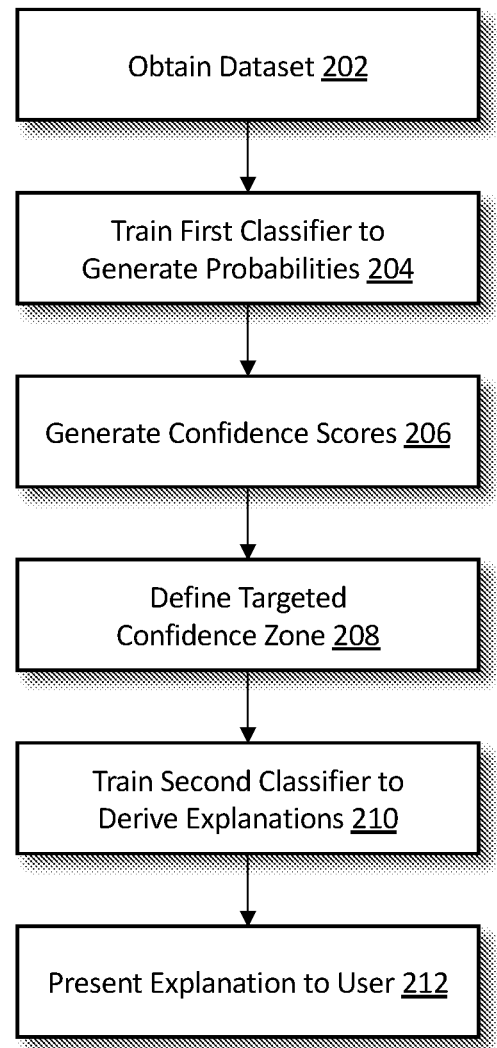

Referring now to FIG. 2, an operational flowchart illustrating the exemplary generating explanations for machine learning classifier confidence levels process 200 used by the prediction explanation program 110a, 110b according to at least one embodiment is depicted. The prediction explanation program 110a, 110b may generate explanations for confidence levels of machine learning models and classifiers to assist users with information relating to how much a user may rely on the model predictions. The steps to generate and provide a user with explanations are now set forth.

At 202, a dataset is obtained. The dataset may be obtained from, for example, public domain databases or from private domain databases with proper approval to access the private domain database. The data that is obtained may include historical data stored and updated or real-time data received, for example, from sensors, smart phones or internet of things (IoT) devices. The dataset may include feature data that specifically refers to features of the domain or information and may include or may not include class labels or tags. Feature data is not required to have class labels. The dataset may include structured data, unstructured data or both. Test data and image data may represent or be unstructured data in a dataset and data may also be provided by users or may be directly taken from the dataset. For example, the dataset is obtained from a public database that stores historical data related to a specific domain and the dataset is used as test data for the classifier.

At 204, a first classifier is trained to generate probabilities. The first classifier may generate probabilities based on the dataset obtained at step 204. The first classifier may be a machine learning classifier or a classifier used to predict probabilities based on the dataset. The dataset is fed into the classifier and trained for the task of classifying the dataset or to perform classification tasks. The classifier may use the dataset or training data for identifying how input variables relate to classifications. The classifier may be trained using a dataset that is structured data or unstructured data. The classifier may be trained to produce, for example, a probability, a default probability or a label probability. The classifier may be a text classifier (e.g., an unstructured data classifier), a particular domain classifier (e.g., loan default classifier) or a structured data classifier. Any machine learning (ML) classification algorithm may be used and compatible with the prediction explanation program 110*a*, 110*b*.

The classifier may ingest the dataset and generate probabilities of target classes as an output. Two running examples may be provided. One example will contain a structured dataset (i.e., structured dataset example), such as a spreadsheet containing rows and columns. The other example may contain an unstructured dataset (i.e., unstructured dataset example), such as a text document.

The structured dataset example includes a banking example relating to loan information. The data obtained includes a spreadsheet of rows and columns containing income information, credit scores and a delinquency rating. The structured data is fed into a loan default classifier and the output of the loan default classifier is a default probability with a percentage rating for the list of income, credit score and delinquency rating rows. The unstructured dataset example includes using text data to feed into a text classifier. The text data or the unstructured dataset examples may include chatbot development data, social media sentiment analysis or a news topic classification. The text classifier provides an output of label probabilities (e.g., 5%, 45% and 70%).

At 206, confidence scores are generated. The probabilities generated at step 204 may be transformed to create confidence scores. The trained classifier may be used to generate confidence scores for predictions of each instance, with each instance being a single data point from the dataset. The dataset used to generate the confidence scores may include a dataset used for making predictions. Confidence scores may include a classifier's predicted probability for the predicted class.

The continuing structured dataset example for generating confidence scores includes taking the classifier's predicted probability for the predicted class as the confidence score for each instance. The continuing unstructured dataset example for generating confidence scores includes converting the labeled probabilities into prediction probability confidence scores (e.g., 95%, 55% and 70%).

At 208, targeted confidence zones are defined. The generated confidence scores at step 206 may be used to create a targeted confidence zones (i.e., confidence buckets or confidence partitions). The confidence zone may be a range defined by an upper bound confidence score and a lower bound confidence score such that a prediction or any prediction with a confidence score between the upper bound threshold and the lower bound threshold falls in the specified confidence zone. The targeted confidence zone, for example, may include a low versus high confidence within a confidence range.

The targeted confidence zones may be in a form of a confidence range or in the form of dividing the whole space by N levels or N zones. For example, the user may divide the confidence spectrum, from 0-100%, into several zones. The specific number of zones may be decided by the user. For example, the user can split the range into three zones, low from 0-33%, medium from 34%-66% and high from 67%-100%. The zones may be split into a large number of ways, for instance there can be N zones and the percentages can be varying ranges. Using the three zones as a further example, the zones can also be split into low from 0-10%, medium from 11%-75% and high from 76%-100%. The defined zones may be created by the user and may be domain dependent, task dependent or both. Each confidence zone may be treated as a binary classifier (e.g., in/out) and may be used to derive explanations for the defined confidence zones.

The continuing structured dataset example for defining targeted confidence zones includes dividing the confidence scores into zones, buckets or partitions based on low, medium or high confidence. The continuing unstructured dataset example for defining targeted confidence zones includes grouping the confidence scores together into confidence zones or partitions that relate to low, medium and high. For both examples, the confidence score of 95% is high, 55% is low and 70% is medium.

At 210, a second classifier is trained to derive explanations. The second classifier may be, for example, a binary classifier, a text classifier, a particular domain classifier, or a structured data classifier. The confidence zones and the dataset may be used to train a second classifier with data in/out of the zone. The second classifier is a different classifier than the first classifier created at step 204. The dataset for the second classifier may, for example, include features of the structured data or features of the text data or the unstructured data. The second classifier may be used to generate explanations of the confidence levels given by the first classifier. For example, explanations may be generated using rule deduction, by training a decision tree or based on feature importance. The rule deduction process may include, for example, using the repeated incremental pruning to produce error reduction (RIPPER) algorithm.

The continuing structured dataset example for training a classifier to derive explanations includes processing the confidence zones or partitions of low, medium and high confidence or confidence levels through a rule deduction algorithm, such as the RIPPER algorithm. Features provided in the structured data spreadsheet (e.g., income, credit score and delinquency rating) are also processed through the rule deduction algorithm, such as the RIPPER algorithm. The continuing unstructured dataset example for training a classifier to derive explanations includes using the confidence zones and the text data to identify important features (i.e., keywords) by a text classifier. The text classifier will generate explanations, such as a feature set or feature sets, for each instance.

The features may correspond, for example, to a likelihood of default on a loan. Using decision boundaries, classes of data may be separated from each other class of data from a different feature space. Mathematically, for example, decision boundaries can be considered hyperdimensional planes that separate one class of data from another class of data in the feature space. Industry inquiries and decisions, such as the decision to grant a loan, may rely on many features and the decision boundaries include ranges of one or multiple features that correspond to a high likelihood of default.

At 212, the explanation is presented to the user. Explanations may be generated and applied to any machine learning (ML) classification algorithm. The explanations may be provided to the user on the user's computing device in the form of rules, decision trees or feature sets. For example, feature sets include keywords for a text-based classifier or super-pixels for images.

The continuing structured dataset example for providing an output to the user includes an output that will provide or generate explanations rules for each confidence zone. For example, (high credit score, low delinquency) or (low credit score, high delinquency)=>high confidence; (high credit score, medium delinquency)=>medium confidence; and (medium credit score, medium delinquency)=>low confidence.

The continuing unstructured dataset example for providing an output to the user includes an output that will provide information, such as the text classifier's confidence is low because the most distinct features of the text are "posting", "host", "NNTP" and the features are not strong predictors of the text classes. Additionally, the text classifier's confidence is high because the most distinct features of the text "love" is a strong predictor of the text classes.

According to an alternate embodiment, the explanation may be presented to the user based on a ranking criteria. For example, coverage, closeness or relevance to a user's previous input, importance or frequency for the domain.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
FIG. 3 is a block diagram of internal and external components of computers and servers depicted in FIG. 1 according to at least one embodiment.
Figure 3:
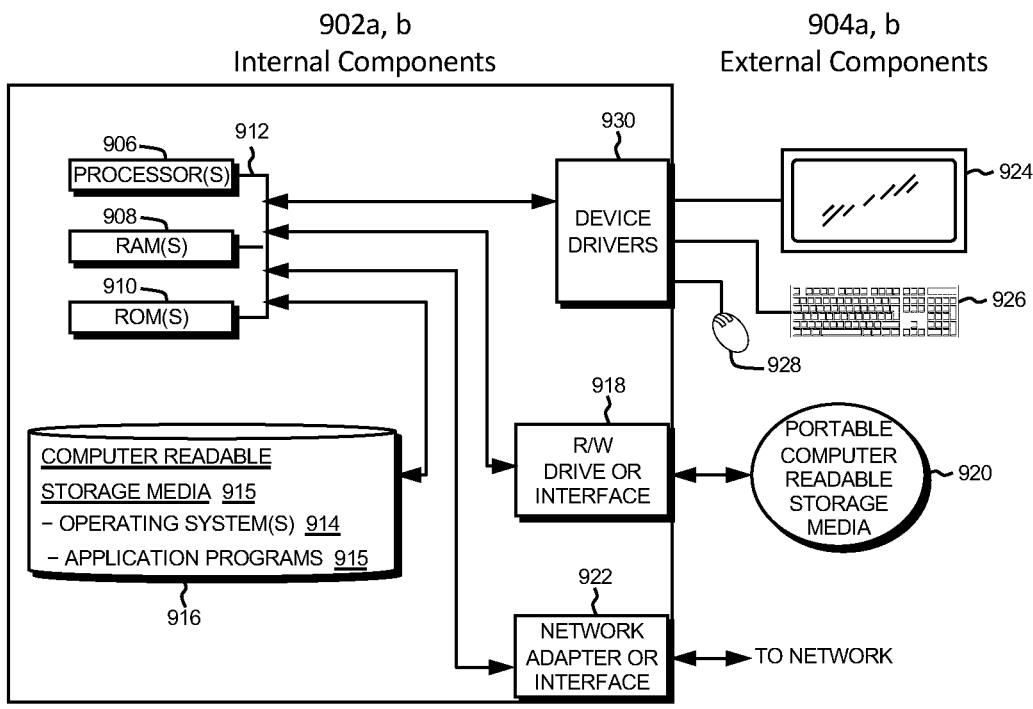

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Computer 102 and server 112 may include respective sets of internal components 902 *a, b* and external components 904 *a, b* illustrated in FIG. 3. Each of the sets of internal components 902 *a, b* includes one or more processors 906, one or more computer-readable RAMs 908 and one or more computer-readable ROMs 910 on one or more buses 912, and one or more operating systems 914, with one or more application programs 915 and one or more computer readable storage media 915. The one or more operating systems 914, the software program 108, and the outage restoration prediction program 110*a* in client computer 102, and the outage restoration prediction program 110*b* in network server 112, may be stored on one or more computer readable storage media 915 for execution by one or more processors 906 via one or more RAMs 908 (which typically include cache memory). In the embodiment illustrated in FIG. 3, each of the computer readable storage media 915 is a magnetic disk storage device of an internal hard drive. Alternatively, each of the computer readable storage media 915 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the prediction explanation program 110*a*, 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G/4G/5G wireless interface cards or other wired or wireless communication links. The software program 108 and the prediction explanation program 110*a* in the computer 102 and the prediction explanation program 110*b* in a network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the prediction explanation program 110*a* in computer 102 and the prediction explanation program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
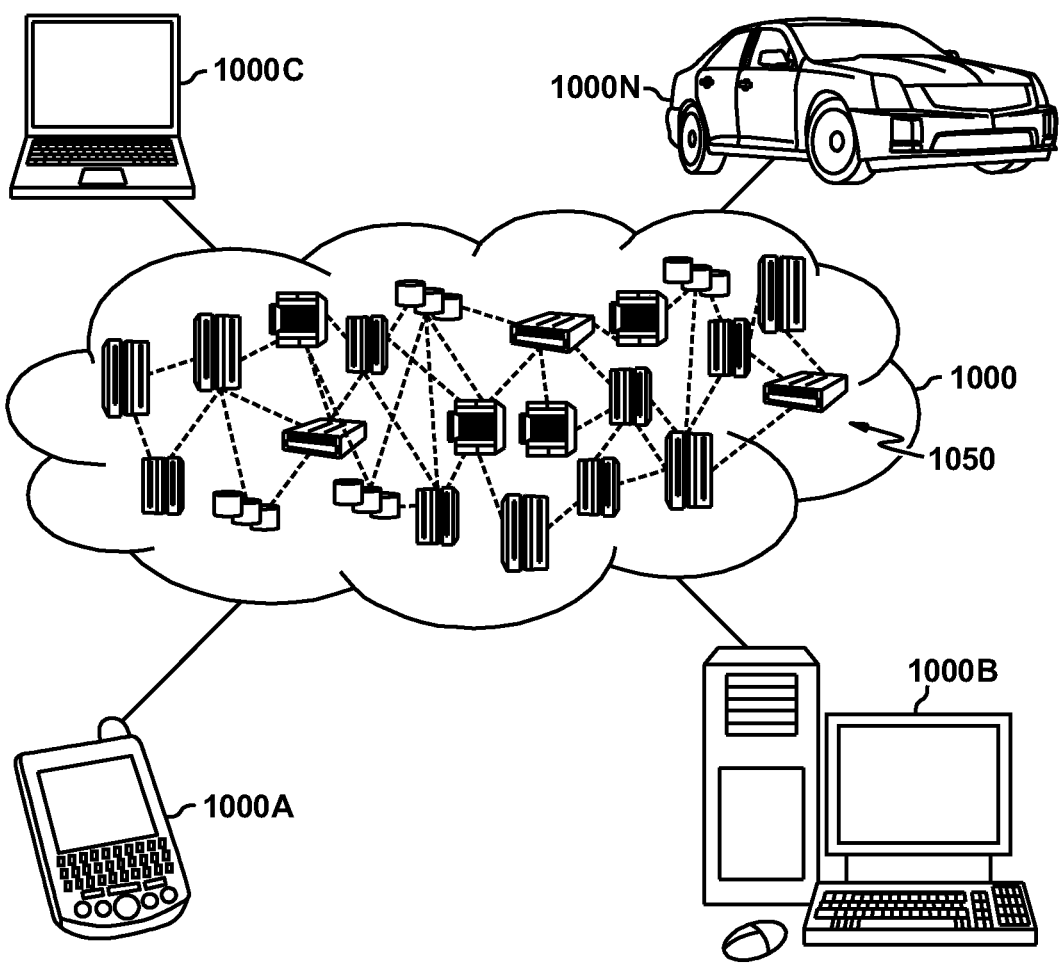
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, the cloud computing environment 1000 includes one or more cloud computing nodes 1050 with which local computing devices used by cloud consumers, such as, for example, personal digital assistant (PDA) or cellular telephone 1000A, desktop computer 1000B, laptop computer 1000C, and/or automobile computer system 1000N may communicate. Cloud computing nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 1050 and cloud computing environment 1000 can communicate with any type of computerized device over any type of network and/or network addressable connection (e.g., using a web browser).

Figure 5:
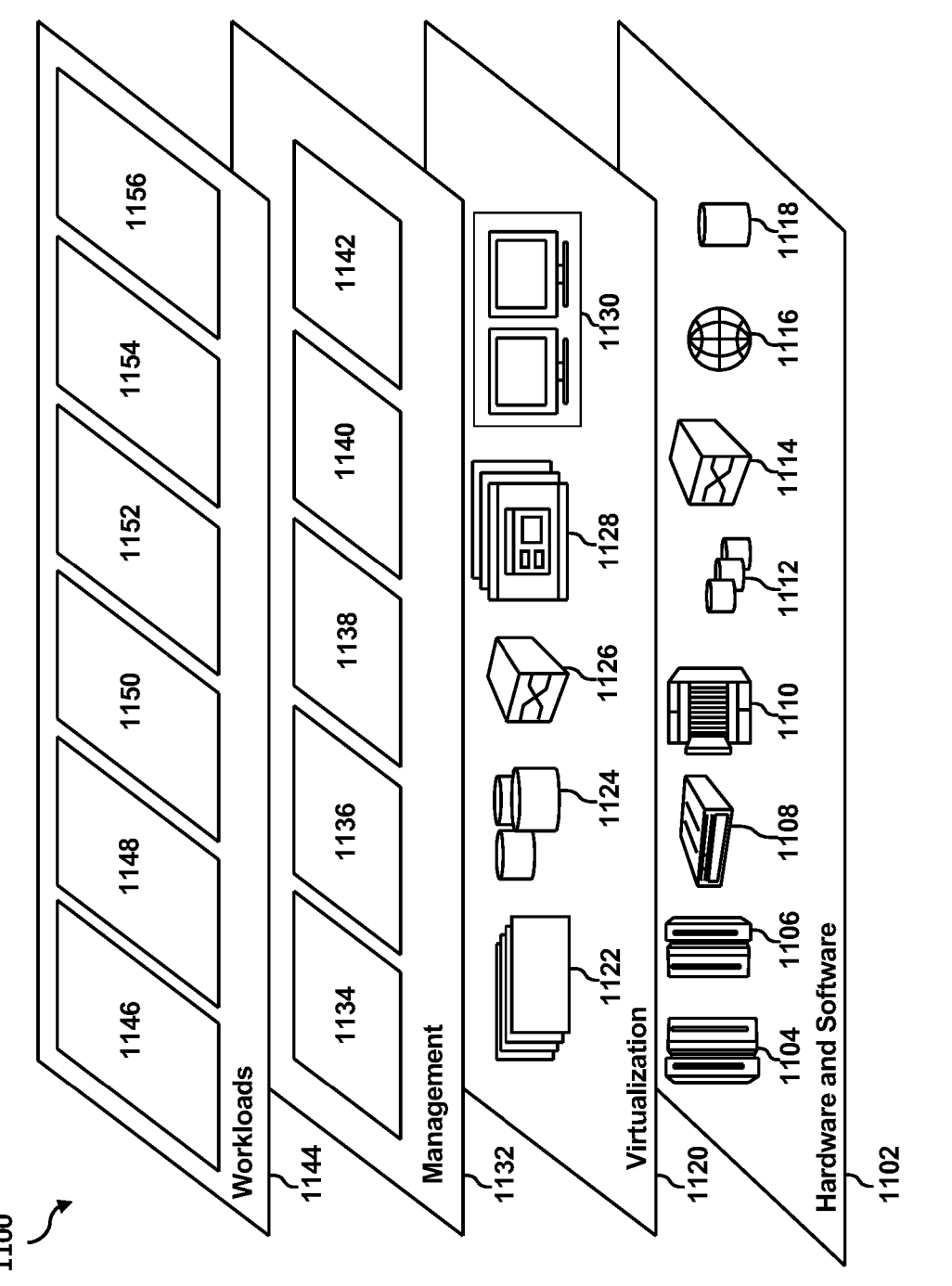
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

A hardware and software layer 1102 include hardware and software components. Examples of the hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, a management layer 1132 may provide the functions described below. Resource provisioning 1134 provides dynamic procurement of computing resources and other resources that are utilized to perform tasks within the cloud computing environment. Metering and pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions that may be provided from this layer include: mapping and navigation 1146; software development and lifecycle management 1148; virtual classroom education delivery 1150; data analytics processing 1152; transaction processing 1154; and prediction explanation 1156. A prediction explanation program 110a, 110b provides a way to generating explanations for machine learning classifier confidence levels.

The present invention may be a system, a method, and/or a computer program product at any possible technical detail level of integration. The computer program product may include a computer readable storage media 915 (or media) having computer readable program instructions thereon for causing a processor 906 to carry out aspects of the present invention.

The computer readable storage media 915 can be a tangible device that can retain and store instructions for use by an instruction execution device. The computer readable storage media 915 may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage media 915 includes the following: a portable computer diskette, a hard disk, a random access memory (RAM) 908, a read-only memory (ROM) 910, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage media 915, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage media 915 or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface 922 in each computing/processing device receives computer readable program instructions from the network and forwards the computer readable program instructions for storage in a computer readable storage media 915 within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor 906 of a general purpose computer, special purpose computer, or other programmable data processing apparatus to produce a machine, such that the instructions, which execute via the processor 906 of the computer or other programmable data processing apparatus, create means for implementing the functions/acts specified in the flowchart and/or block diagram block or blocks. These computer readable program instructions may also be stored in a computer readable storage media 915 that can direct a computer, a programmable data processing apparatus, and/or other devices to function in a particular manner, such that the computer readable storage media 915 having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
obtaining a structured dataset comprising numerical or categorical features;

training a first machine learning classifier using the structured dataset to generate prediction probabilities, each prediction probability indicating a likelihood of correctness for a corresponding data point;

transforming the prediction probabilities into confidence scores using the first classifier to generate a confidence level for each data point;

defining targeted confidence zones based on the confidence scores, wherein each confidence zone corresponds to a defined confidence range and is domain-specific or task-dependent;

training a second classifier on records labeled with the targeted confidence zones to derive zone-specific explanations of why the first classifier is confident or not confident for records assigned to each targeted confidence zone, wherein the second classifier comprises a rule-deduction model configured to generate symbolic rules based on features corresponding to the targeted confidence zones;

identifying explanation features for a current input based on the confidence zone assigned by the first classifier; and outputting the explanations for the current input as symbolic rules that specify feature conditions associated with the assigned targeted confidence zone.

2. The method of claim 1, wherein the first machine learning classifier is trained to classify the dataset into one or more classes using the structured features of the dataset.

3. The method of claim 1, wherein the second machine learning classifier generates explanations of prediction confidence levels that indicate feature conditions under which the first classifier produces high-confidence or low-confidence predictions.

4. The method of claim 1, wherein the targeted confidence zones and the dataset are used to train the second machine learning classifier such that the second classifier learns symbolic rules specific to each confidence zone.

5. The method of claim 1, wherein the explanations are derived by partitioning the targeted confidence zones into low, medium and high confidence levels.

6. The method of claim 1, wherein the explanations are derived by using the targeted confidence zones and data to identify features.

7. The method of claim 1, wherein the output is provided in the form of symbolic rules learned for the targeted confidence zone.

8. A computer-implemented method comprising:
obtaining an unstructured text dataset comprising textual features;

training a first machine learning classifier using the unstructured text dataset to generate prediction probabilities;

generating confidence scores based on the prediction probabilities using the first classifier;

segmenting the confidence scores into targeted confidence zones comprising at least a low-confidence zone and a high-confidence zone, wherein each zone is defined based on a task-specific threshold;

training a second classifier, different from the first classifier, using zone-labeled text data to derive zone-specific symbolic rules that explain why the first classifier is confident or not confident for text data points assigned to the targeted confidence zones, wherein the second classifier comprises a rule-based model configured to generate symbolic rules based on textual features corresponding to the targeted confidence zones;

identifying keywords associated with the targeted confidence zone for a current user-submitted input;

filtering the identified keywords based on semantic proximity to a previous user input; and presenting the filtered zone-specific symbolic rules corresponding to the confidence zone assigned to the input.

9. The computer-implemented method of claim 8, wherein the first machine learning classifier is trained to classify the unstructured text dataset into one or more classes based on textual features.

10. The computer-implemented method of claim 8, wherein the second machine learning classifier generates explanations of prediction confidence levels that indicate feature conditions associated with the low-confidence zone or the high-confidence zone.

11. The computer-implemented method of claim 8, wherein the targeted confidence zones and the dataset are used to train the second machine learning classifier to learn symbolic rules specific to each confidence zone.

12. The computer-implemented method of claim 8, wherein the explanations are derived by partitioning the targeted confidence zones into low, medium and high confidence levels.

13. The computer-implemented method of claim 8, wherein the explanations are derived by using the targeted confidence zones and text data to identify features.

14. The computer-implemented method of claim 8, wherein the output is provided in a form of rules that state textual feature conditions for the assigned targeted confidence zone.

15. A computer-implemented method comprising:

obtaining an image-based dataset comprising pixel values or image regions;

training a first machine learning classifier using the image-based dataset to generate prediction probabilities for image regions, each prediction probability indicating a likelihood of correctness for a corresponding image region;

generating confidence scores based on the prediction probabilities using the first classifier;

segmenting the confidence scores into targeted confidence zones comprising at least a low-confidence zone and a high-confidence zone, wherein each zone is defined based on a task-specific threshold;

training a second machine learning classifier, different from the first machine learning classifier, using zone-labeled image regions to derive zone-specific symbolic rules that explain why the first machine learning classifier is confident or not confident for data points assigned to the targeted confidence zones, wherein the second machine learning classifier comprises a rule-based model configured to generate symbolic rules based on pixel-level or region-level features corresponding to the targeted confidence zones;

identifying symbolic rules associated with the targeted confidence zone for a current input; and presenting to the user the symbolic rules corresponding to the targeted confidence zone assigned to the image region.

16. The computer-implemented method of claim 15, wherein the first machine learning classifier is trained to classify image regions into one or more classes based on pixel-level or region-level features.

17. The computer-implemented method of claim 15, wherein the second machine learning classifier generates explanations of prediction confidence levels that indicate pixel-level feature conditions associated with the corresponding targeted confidence zone.

18. The computer-implemented method of claim 15, wherein the targeted confidence zones and the dataset are used to train the second machine learning classifier to learn symbolic rules specific to each confidence zone.

19. The computer-implemented method of claim 15, wherein the explanations are derived by partitioning the targeted confidence zones into low, medium and high confidence level.

20. The computer-implemented method of claim 15, wherein the explanations are derived by using the targeted confidence zones and image-based data to identify pixel-level or region-level features.

* * * * *